(12) United States Patent
Al-Bayati et al.

(10) Patent No.: US 12,077,732 B2
(45) Date of Patent: Sep. 3, 2024

(54) BLEACH CATALYST

(71) Applicant: RECKITT BENCKISER FINISH B.V., Hoofddorp (NL)

(72) Inventors: Alias Younis Al-Bayati, Heidelberg (DE); Torsten Roth, Heidelberg (DE); Claudia Schmaelzle, Heidelberg (DE); Dora Zamuner, Mira (IT); John Mark Douthwaite, Cardiff (GB); Graham John Hutchings, Cardiff (GB); Naomi Markham, Cardiff (GB); Stuart Hamilton Taylor, Cardiff (GB)

(73) Assignee: Reckitt Benckiser Finish B.V., Hoofddorp (NL)

( * ) Notice: Subject to any disclaimer, the term of this patent is extended or adjusted under 35 U.S.C. 154(b) by 0 days.

(21) Appl. No.: 18/000,142

(22) PCT Filed: May 20, 2021

(86) PCT No.: PCT/EP2021/063471
§ 371 (c)(1),
(2) Date: Nov. 29, 2022

(87) PCT Pub. No.: WO2021/244861
PCT Pub. Date: Dec. 9, 2021

(65) Prior Publication Data
US 2023/0119694 A1    Apr. 20, 2023

(30) Foreign Application Priority Data

Jun. 5, 2020 (GB) .................... 2008512

(51) Int. Cl.
*C11D 3/39* (2006.01)
*B01J 21/06* (2006.01)
(Continued)

(52) U.S. Cl.
CPC ............ *C11D 3/3905* (2013.01); *B01J 21/06* (2013.01); *C11D 3/02* (2013.01); *C11D 3/3953* (2013.01);
(Continued)

(58) Field of Classification Search
CPC ............ C11D 3/02; C11D 3/3905; C11D 7/02
(Continued)

(56) References Cited

U.S. PATENT DOCUMENTS

| | | |
|---|---|---|
| 2010/0298195 A1 | 11/2010 | Franzolin et al. |
| 2014/0053877 A1 | 2/2014 | Letzelter et al. |
| 2014/0303059 A1 | 9/2014 | Hepper et al. |

FOREIGN PATENT DOCUMENTS

| | | | |
|---|---|---|---|
| CN | 101668842 A | 3/2010 | |
| EP | 2520166 A1 * | 11/2012 | ............ A01N 25/30 |

(Continued)

OTHER PUBLICATIONS

Severino et al., Nature of Copper Active Sites in the Carbon Monoxide Oxidation on CuAl 2O 4and CuCr 2O 4Spinel Type Catalysts, Jul. 1, 1998, Journal of Catalysis, pp. 82-95.
(Continued)

*Primary Examiner* — Gregory R Delcotto
(74) *Attorney, Agent, or Firm* — Dunlap Codding, P.C.

(57) ABSTRACT

A bleach catalyst suitable for use in automatic dishwashing comprising a mixed metal oxide.

9 Claims, 2 Drawing Sheets

(51) Int. Cl.
| | |
|---|---|
| *C11D 3/02* | (2006.01) |
| *C11D 3/395* | (2006.01) |
| *C11D 7/02* | (2006.01) |
| *C11D 7/20* | (2006.01) |
| *C11D 17/00* | (2006.01) |

(52) U.S. Cl.
CPC .............. *C11D 7/02* (2013.01); *C11D 7/20* (2013.01); *C11D 17/0091* (2013.01)

(58) Field of Classification Search
USPC ........................................ 510/220, 376, 508
See application file for complete search history.

(56) References Cited

FOREIGN PATENT DOCUMENTS

| | | | |
|---|---|---|---|
| GB | 2572364 | * | 10/2019 |
| GB | 2572364 A | | 10/2019 |
| RU | 2009143533 A | | 5/2011 |
| WO | 2007/109239 A2 | | 9/2007 |

OTHER PUBLICATIONS

Afsharizadeh et al., Catalytic Synthesis of Biodiesel from Waste Cooking Oil and Corn Oil Over Zirconia-based Metal Oxide Nanocatalysts, Reaction Kinetics, Mechanisms and Catalysis, Jul. 1, 2019, vol. 128, No. 1.
Bussi et al., Ethanol Steam Reforming Over NiLaZr and NiCuLaZr Mixed Metal Oxide Catalysts Catalysis Today, May 21, 2013, vol. 213, pp. 42-49.
International Search Report and Written Opinion for PCT Application No. PCT/EP2021/063471 mailed Aug. 25, 2021.
International Preliminary Report on Patentability for PCT Application No. PCT/EP2021/063471 mailed Sep. 21, 2022.
Combined Search and Examination Report for GB Patent Application No. 2008512.2 mailed Nov. 18, 2020.
English translation of Search Report for Chinese Application No. 2021018004124.0 dated May 20, 2023.

* cited by examiner

BLEACH CATALYST

CROSS-REFERENCE TO RELATED APPLICATIONS

This application is a U.S. National Phase of International Patent Application No. PCT/EP2021/063471, filed on 20 May 2021, which claims priority to United Kingdom Application No. 2008512.2 filed 5 Jun. 2020. The entire contents of these applications are incorporated herein by reference in their entirety.

BACKGROUND

The present invention relates to a catalyst, specifically a bleach catalyst, methods of preparing the same and its use thereof in automatic dishwashing methods.

Oxygen bleaches are well known for their ability to remove stains from substrates. Traditionally the substrate is subjected to hydrogen peroxide. The latter may be inorganic or organic peroxides. However, these systems must typically be activated, with temperatures of 60° C. and higher needed to accomplish the activation. Unfortunately, high temperatures are energy intensive and can deactivate enzymes.

A preferred approach is the use of an inorganic peroxide coupled with an organic activator compound. These systems are employed for many commercial detergents and are often based on tetraacetyl ethylene diamine (TAED) in combination with sodium perborate or percarbonate.

Bleach (or oxidation) catalysts are therefore employed in the field of stain removal. Such catalysts result in the further activation of bleach-active species employing peroxy compounds, including hydrogen peroxide or a hydrogen peroxide adducts.

Current catalyst technology which has been used in commercial formulations for automatic dishwashing is based on homogeneous manganese catalysts. Manganese catalysts based on triazacyclononane ligands (e.g. 1,4,7-Trimethyl-1,4,7-triazacyclononane (TACN)), are known to be active catalysts in the bleaching of stains in laundry detergent products and in dishwash products and for treatment of cellulosic substrates in e.g. wood-pulp or raw cotton. Among these, MnTACN is considered an industry benchmark for bleaching activity, despite its high price. While further substantial endeavours into homogeneous catalysts in the past have revealed other stable and active molecular structures, only a few have been commercialised. Despite heterogeneous catalysts being used in a multitude of unrelated industrial oxidation processes, this technology has so far not been successfully employed in the context of consumer automatic dishwashing (ADW) and stain removal.

Precious or toxic metals have been used as heterogeneous oxidation catalysts and are used in industrial processes. However, a field such as dishwashing requires both a cheaper and more benign alternative. For a metal to be useful as a bleach catalyst in a detergent bleach composition, the metal compound must not unduly promote peroxide decomposition by non-bleaching pathways and must be hydrolytically and oxidatively stable. Furthermore, due to a plethora of food soils (e.g. soils containing reactive functional groups such as sulphides, thiols, various amino acids, etc.) as well as detergent ingredients with potentially coordinating moieties (e.g. enzymes, reactive oxidizing agents, surfactants, corrosion inhibitors, polymers, etc., inhibition of the catalytically active sites in the dishwasher is a major concern.

Non-patent literature AFSHARIZADEH MARYAM ET AL: "Catalytic synthesis of biodiesel from waste cooking oil and corn oil over zirconia-based metal oxide nanocatalysts", REACTION KINETICS, MECHANISMS AND CATALYSIS, AKADEMIAT KIADO RT, HU, vol. 128, no. 1, 1 Jul. 2019 (2019-07-01), pages 443-459, XP036882852, ISSN: 1878-5190, DOI: 10. 1007/S11144-019-01622-9 [retrieved on 2019 Jul. 1] discloses $ZrO_2$—$SrO_2$ and $ZrO_2$—$CuO$ mixed oxides with different molar ratios, which were synthesized via Pechini sol-gel and co-precipitation methods. Their catalytic activities were examined for biodiesel production from cheap raw feedstocks.

Non-patent literature SEVERINO F ET AL: "Nature of Copper Active Sites in the Carbon Monoxide Oxidation on CuAl"20"4 and CuCr"20"4 Spinel Type Catalysts", JOURNAL OF CATALYSIS, ACADEMIC PRESS, DULUTH, MN, US, vol. 177, no. 1, 1 Jul. 1998 (1998-07-01), pages 82-95, XP004465390, ISSN: 0021-9517, DOI: 10. 1006/JCAT. 1998.2094 discloses a study of a simplified catalytic system based on $CuAl_2O_4$ and $CuCr_2O_4$ catalysts in order to gain further insight into the nature of the copper species present on the surface of such bulk catalysts.

US 2010/0298195 A1 discloses a composition comprising a bleaching catalyst admixed with an insoluble support matrix, wherein the bleach catalyst comprises a transition metal compound based upon one or more of manganese, copper, iron, silver, platinum, cobalt, nickel, titanium, vanadium, cerium, lanthanum, zirconium, tungsten, molybdenum, ruthenium.

There is therefore a need to develop a cost-effective, heterogeneous catalyst based on abundant and benign metals, which delivers a significant bleach performance in an automatic dishwashing machine, and which can be produced at scale in an uncomplicated and economically efficient process.

The present invention addresses these problems.

BRIEF SUMMARY OF THE INVENTION

In one aspect, the invention provides an automatic dishwashing composition comprising a heterogenous bleach catalyst comprising a mixed metal oxide.

In another aspect, the invention provides a method of preparing a heterogenous mixed metal oxide catalyst suitable for use in automatic dishwashing, the method comprising: (a) the precipitation of two or more metal salts; (b) the precipitation forms the mixed-metal oxalate; (c) the precipitate is calcined to form the mixed metal oxide; and (d) the mixed metal oxide is treated with acid, and wherein the heterogenous bleach catalyst comprises copper oxide on a zirconium oxide carrier.

DETAILED DESCRIPTION

Figure 1:
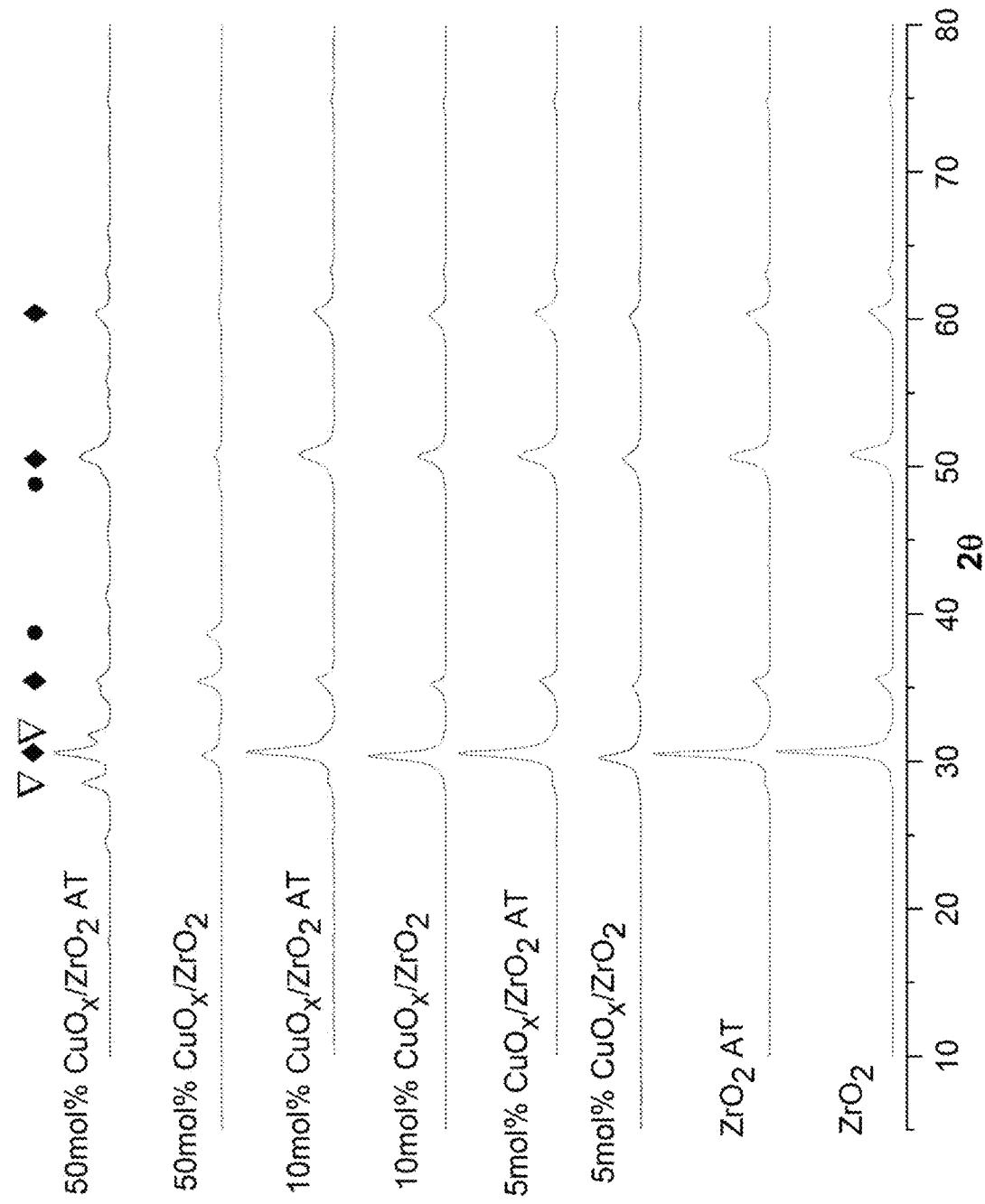
FIG. 1 shows X-ray powder diffraction patterns that were used to identify bulk phases present in the catalyst both pre- and post acid treatment.

In a first aspect of invention there is provided a heterogenous bleach catalyst for use in automatic dishwashing comprising a mixed metal oxide.

Preferably, one or more of the metal oxide(s) is a transition metal.

Advantageously the mixed metal oxide is a metal oxide on a metal oxide carrier. The catalyst may therefore comprise a transition metal oxide, preferably a first-row transition metal oxide such as copper, manganese, iron, and/or zinc, on a transition metal oxide carrier, such as zirconium oxide carrier.

Without being bound by theory, zirconium oxide (also known as zirconia, zirconium dioxide or $ZrO_2$) is considered to be particularly beneficial as a carrier as it can stabilise short lived radical species that may be required for heterogeneous bleaching.

The transition metal oxide is preferably present in an amount from 1 to 50 mol %, such from 1 to 45 mol %, from 1 to 35 mol %, from 1 to 25 mol %, from 1.5 to 22.5 mol %, preferably from 2 to 20 mol %, such as from 2.5 to 15 mol %, relative to the metal oxide carrier.

In a particularly preferred option, the catalyst comprises copper oxide on a zirconium oxide carrier. This is because, without being bound by theory, the formation of $Cu(OH)_2$ may serve as the active species in the bleaching process.

Preferably, the copper surface area is greater than zero, such as greater than 0.01 $m^2/g$ and less than 4 $m^2/g$, such as less than 3 or 2 $m^2/g$, preferably less than 1 $m^2/g$. It has surprisingly been found that a reduction in the metal surface area results in good bleaching performance.

The catalyst has preferably been calcined. It is believed that calcination of a suitable precursor both serves to generate the mixed metal oxide form and results in an amorphous, high surface area material. The calcination is preferably carried out under air, or another oxygen-containing atmosphere, at a temperature of at least 200° C., such as 250° C., 300° C., 350° C., 400° C., 450° C., or even at least 500° C.

The inventors have also surprisingly found an improvement in catalytic performance with catalysts that have been acid treated, such as washing with nitric acid ($HNO_3$), sulphuric acid ($H_2SO_4$), hydrochloric acid (HCl) or other strong acids. Without wishing to be bound by theory, it is believed that the acid treatment reduces the surface concentration of copper and removes large CuO particles that decompose $H_2O_2$ to $H_2O$ and so reduce the bleaching activity.

Advantageously, the catalyst may have a bleaching activity that is comparable to the homogeneous reference catalyst Mn(TACN).

In a second aspect of the invention there is provided an automatic dishwashing composition comprising a heterogenous catalyst as herein described.

When present in an automatic dishwashing composition the composition may be in any form, such as powder, tablet, gel or contained in a water-soluble pouch. Preferably, the product is in a unit dose or monodose form. The final product may comprise a plurality of compositions. For example, the composition as a whole may be split between two or more compositions in the form of a solid, liquid, gel or paste and at least one further composition in the form of a solid, liquid, gel or paste.

The automatic dishwashing composition preferably contains one or more bleaching agents, bleach activators, builders, surfactants and/or enzymes.

The bleaching agent is preferably selected from the group consisting of an oxygen-releasing bleaching agent, a chlorine-releasing bleaching agent and mixtures of two or more thereof. More preferably, the bleaching agent is or comprises an oxygen-releasing bleaching agent.

The bleaching agent may comprise the active bleach species itself or a precursor to that species. Preferably, the bleaching agent is selected from the group consisting of an inorganic peroxide, an organic peracid and mixtures of two or more thereof. The terms "inorganic peroxide" and "organic peracid" encompass salts and derivatives thereof. Inorganic peroxides include percarbonates, perborates, persulphates, hydrogen peroxide and derivatives and salts thereof. The sodium and potassium salts of these inorganic peroxides are suitable, especially the sodium salts. Sodium percarbonate is particularly preferred In the case of automatic dishwashing compositions, it is preferred to minimise the amount of anionic surfactant and accordingly, the composition preferably comprises no more than 2 wt %, no more than 1 wt %, or no, anionic surfactant. Non-ionic surfactants are especially preferred instead for automatic dishwashing products.

The builder is advantageously selected from the group consisting of methylglycine diacetic acid (MGDA), N,N-dicarboxymethyl glutamic acid (GLDA), citrate and combinations of two or more thereof. It is to be appreciated that the terms MGDA, GLDA and citrate encompass the free acids as well as salts, esters and derivatives thereof. Preferably, the citrate is trisodium citrate.

Other phosphorous-free builders include succinate-based compounds. The terms "succinate-based compound" and "succinic acid based compound" are used interchangeably herein.

Particular suitable builders include; for example, aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl) aspartic acid (SMAS), N-(2-sulfoethyl)aspartic acid (SEAS), N-(2-sulfomethyl)glutamic acid (SMGL), N-(2-sulfoethyl)glutamic acid (SEGL), N-methyliminodiacetic acid (MIDA), a-alanine-N,N-diacetic acid (a-ALDA), β-alanine-N,N-diacetic acid (β-ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N, N-diacetic acid (TUDA) and sulfomethyl-N,N-diacetic acid (SM DA) and alkali metal salts or ammonium salts thereof.

Suitable builders include; for example, aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl) aspartic acid (SMAS), N-(2-sulfoethyl)aspartic acid (SEAS), N-(2-sulfomethyl)glutamic acid (SMGL), N-(2-sulfoethyl)glutamic acid (SEGL), N-methyliminodiacetic acid (MIDA), a-alanine-N,N-diacetic acid (a-ALDA), β-alanine-N,N-diacetic acid (β-ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N, N-diacetic acid (TUDA) and sulfomethyl-N,N-diacetic acid (SM DA) and alkali metal salts or ammonium salts thereof.

Further succinate compounds have the formula:

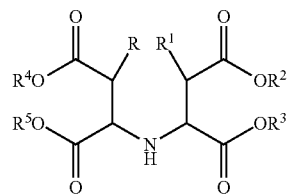

in which R, R1, independently of one another, denote H or OH; R2, R3, R4, R5, independently of one another, denote a cation, hydrogen, alkali metal ions and ammonium ions, ammonium ions having the general formula $R^6R^7R^8R^9N^+$ and R6, R7, R8, R9, independently of one another, denote hydrogen, alkyl radicals having 1 to 12 C atoms or hydroxyl-substituted alkyl radicals having 2 to 3 C atoms.

Examples include tetrasodium iminosuccinate. Iminodisuccinic acid (IDS) and (hydroxy)iminodisuccinic acid (HIDS) and alkali metal salts or ammonium salts thereof are especially preferred succinate based builder salts. The phosphorous-free co-builder may also or alternatively comprise non-polymeric organic molecules with carboxylic group(s). Builder compounds which are organic molecules containing carboxylic groups include citric acid, fumaric acid, tartaric acid, maleic acid, lactic acid and salts thereof. In particular the alkali or alkaline earth metal salts of these organic compounds may be used, and especially the sodium salts.

Most preferably, however, the builder is a carboxylate, such as citrate, and/or an aminocarboxylate, such as methylglycine diacetic acid.

The composition may include one or more polymers. The polymers are intended to improve the cleaning performance of the automatic dishwashing composition. For example, sulphonated polymers may be used. Preferred examples include copolymers of $CH_2=CR^1CR^2R^3$—O—$C_4H_3R^4$—$SO_3X$ wherein R1, R2, R3, R4 are independently 1 to 6 carbon alkyl or hydrogen, and X is hydrogen or alkali with any suitable other monomer units including modified acrylic, fumaric, maleic, itaconic, aconitic, mesaconic, citraconic and methylenemalonic acid or their salts, maleic anhydride, acrylamide, alkylene, vinylmethyl ether, styrene and any mixtures thereof. Other suitable sulfonated monomers for incorporation in sulfonated (co)polymers are 2-acrylamido-2-methyl-1-propanesulphonic acid, 2-methacrylamido-2-methyl-1-propanesulphonic acid, 3-methacrylamido-2-hydroxy-propanesulphonic acid, allysulphonic acid, methallysulphonic acid, 2-hydroxy-3-(2 propenyloxy) propanesulphonic acid, 2-methyl-2-propenen-1-sulphonic acid, styrenesulphonic acid, vinylsulphonic acid, 3-sulphopropyl acrylate, 3-sulphopropylmethacrylate, sulphomethylacrylamide, sulphomethylmethacrylamide and water soluble salts thereof.

Also preferred are polymers or copolymers comprising acrylic acid, including copolymers of acrylic acid and maleic acid and/or 2-acrylamido-2-methyl-1-propanesulphonic acid.

The composition may include one or more enzymes. It is preferred that the one or more enzymes are selected from proteases, lipases, amylases, cellulases and peroxidases, with proteases and amylases being most preferred. It is most preferred that protease and/or amylase enzymes are included in the compositions according to the invention as such enzymes are especially effective in dishwashing detergent compositions. More than one species may be used.

The composition may further comprise one or more bleach activators. Any suitable bleach activator may be included, for example TAED, if this is desired for the activation of the bleaching agent. The bleach activator is preferably present in an amount of from 1 to 15 wt. %, such as from 2 to 12 wt. %, from 3 to 11 wt. % or even from 4 to 8 wt. %.

In a third aspect of the invention there is provided the use of a catalyst as herein described, or an automatic dishwashing composition comprising such a catalyst, in an automatic dishwashing process.

The catalyst may be present in either an automatic dishwashing composition that is consumed entirely in a dishwashing cycle, or remains in the machine for two or more dishwashing cycles. For instance, the catalyst may be immobilised in an automatic dishwasher.

Preferably, the catalyst and/or composition is used to treat bleachable stains.

In a fourth aspect of the invention there is provided a method of preparing a heterogenous mixed metal oxide catalyst suitable for use in automatic dishwashing, preferably a catalyst as described herein, comprising (a) the precipitation of two or more metal salts.

Preferably, the precipitation step forms the mixed-metal oxalate. The method may use the metal salts, preferably the respective nitrate salts, as the starting materials. An organic solvent, such as an alcohol, preferably ethanol, may be used as the solvent for precipitation. The precipitation may be carried out under air or another oxygen-containing atmosphere. The resulting precipitate may be collected through filtration and/or dried at an elevated temperature, e.g. greater than 50° C., 60° C., 70° C., 80° C., 90° C. or even 100° C.

The precipitate is advantageously calcined to form the mixed metal oxide. The calcination preferably occurs under a flow of gas, such as air or another oxygen-containing atmosphere. This flow is preferably at a rate of greater than 20 mL/min, such as 30 m L/min or even 40 m L/min.

Preferably, the mixed metal oxide is treated with acid, such as nitric acid ($HNO_3$), sulphuric acid ($H_2SO_4$), hydrochloric acid (HCl) or other strong acids. The step may involve stirring in acid, such as from 1 to 5 hours, or from 2 to 3 hours. The mixed metal oxide may then be washed in water until a neutral pH is returned.

The invention is described in the following, non-limiting Examples.

EXAMPLES

Precipitate Preparation $Cu(NO_3)_2 \cdot 3H_2O$ (0.01 mol) and $ZrO(NO_3)_2$ hydrate (0.01 mol) were dissolved separately in absolute ethanol (100 mL) at room temperature in air. After dissolution, the two solutions were combined in a 400 mL beaker and stirred at room temperature, in air. Oxalic acid dihydrate (3.03 g, 0.024 mol, solid) was subsequently added to this solution, resulting in the immediate precipitation of the metal oxalates. This precipitation is evidenced by a visual change in the appearance of the solution, with a light blue opaque mixture being formed instantaneously. The solution was stirred for an additional 2 hours at room temperature, in air. The oxalate gel was then collected via filtration. This cake was subsequently dried at 110° C. in a static air oven for 16 hours. After drying, the remaining solid is crushed into a blue fine powder using a mortar and pestle.

This procedure was successfully repeated for the synthesis of Cu—Zr, Mn—Zr, Fe—Zr and Zn—Zr oxalate precursors.

Calcination

The oxalate precursors were subsequently calcined under flowing air to produce the desired active material. For the preparation of a $CuO_x/ZrO_y$ catalyst the Cu—Zr oxalate was added to a Coors™ high alumina combustion boat and calcined in a Carbolite™ tube furnace. The tube furnace was heated to 550° C. from ambient temperature at a heating rate of 10° C./min. Once at 550° C., the temperature of the furnace was maintained for 2 hours. During the treatment air was passed over the catalyst at a rate of 50 mL/min. Once the furnace was cooled to room temperature, the powdered catalyst was collected. The decomposition of the Cu—Zr oxalate precursor was evidenced by a change in colour to a darker green and mass loss.

Acid Treatment

The removal of surface metal was subsequently achieved through washing of the material with concentrated $HNO_3$. The corresponding metal oxide (0.2 g) was stirred in $HNO_3$ (70 wt %, 200 mL) for 2 hours at room temperature. The catalyst was collected and separated from the acid by centrifugation and decanting of the acidic solution. Deionised water was added and the catalyst resuspended by shaking, before being centrifuged again and decanted off.

This process was repeated 3 more times until the water post centrifugation had a pH of 7. The catalyst was dried in a static air furnace at 110° C. for 16 h. The catalyst was collected as a dry powder.

Analysis and Results

Bleaching Evaluation of Tea Stains

Sodium percarbonate (1.5 g), TAED (0.45 g) and MGDA (0.2 g) were added to tap water (1.8 L, 5° dH, 89 ppm $CaCO_3$) at 50° C. under vigorous stirring. Tea cups are pre-stained and evaluated according to the IKW procedure (*Recommendations for the Quality Assessment of the Cleaning Performance of Dishwasher Detergents (Part B, Update 2015) German Cosmetic, Toiletry, Perfumery and Detergent Association "Industrieverband Koerperpflege- und Waschmittel" IKW)—Working Group Automatic Dishwashing Detergents Sofw journal*|142|06/16 33-48). A pre-stained tea cup is half submerged in the wash solution and the catalyst (3 mg) was added. After 8 minutes the cup was removed from the beaker and rinsed three times in fresh tap water to remove any bleaching solution residue and to stop bleaching continuing in the cup after the wash, the bleaching performance was visually evaluated using a 1-10 scale, with 1 being no visible bleaching activity and 10 being a completely bleached surface.

A range of copper catalysts with molar ratios from 50% to 1% copper were tested for bleaching performance on tea stains on a cup surface before acid treatment.

The $ZrO_2$ support material, together with the 50 mol %, and 10 mol % copper catalysts were re-tested for bleaching performance after acid treatment.

The results are shown in Table 1.

TABLE 1

| Catalyst Composition | Bleaching Performance Score |
| --- | --- |
| No catalyst | 2 |
| Mn(TACN) | 6 |
| $ZrO_2$ | 2 |
| 50 mol % $Cu_x/ZrO_y$ | 2 |
| 30 mol % $Cu_x/ZrO_y$ | 2 |
| 10 mol % $Cu_x/ZrO_y$ | 3 |
| 5 mol % $Cu_x/ZrO_y$ | 4 |
| 2.5 mol % $Cu_x/ZrO_y$ | 3 |
| 1 mol % $Cu_x/ZrO_y$ | 2 |
| $ZrO_2$ AT | 2 |
| 50 mol % $Cu_x/ZrO_y$ AT | 4 |
| 10 mol % $Cu_x/ZrO_y$ AT | 5 |

Bleaching activity decreases at low copper concentrations. This is expected to be due to the reduced number of active sites on the catalyst which promote bleaching.

Copper Surface Area Analysis

Copper surface area analysis was carried out using ChemBET Pulsar Quantachrome. The catalyst (ca. 100 mg) was loaded into glass tube plugged either side with quartz wool. Temperature programmed reduction was then carried out to reduce copper oxide to copper metal. Hydrogen (150 mL/min) was flowed over the catalyst while it was heated to 140° C. at 10° C./min. Analysis of the sample was then started as it was further heated to 280° C. at 1° C./min. When the temperature reached the desired temperature, it was maintained for 10 mins before cooling. Low temperatures and slow ramp rates were chosen to reduce sintering of the copper particles on the surface.

After cooling the gas was switched to helium (150 mL/min) and the sample heated to 65° C. Analysis was started and regular pulses of $N_2O$ (113 µL) was introduced into the gas stream. As copper reduces $N_2O$ to $N_2$, the amount of $N_2$ produced was recorded. When the $N_2$ peaks stayed a consistent size, the $N_2O$ was switched to $N_2$, and 4 regular pulses of $N_2$ (113 µL) were then used to calibrate against. The total volume of $N_2$ produced during the experiment was used to calculate the copper surface area.

TABLE 2

| Catalyst Composition | Copper Surface Area (m²/g) |
| --- | --- |
| 10 mol % $Cu_x/ZrO_y$ | 4.6 |
| 10 mol % $Cu_x/ZrO_y$ AT | 0.2 |
| 50 mol % $Cu_x/ZrO_y$ | 6.4 |
| 50 mol % $Cu_x/ZrO_y$ AT | 0.4 |

X-Ray Powder Diffraction (XRPD) Analysis

X-ray powder diffraction was used to identify bulk phases present in the catalyst both pre- and post-acid treatment. The diffraction patterns are set out in FIG. 1.

Peaks denoted with a diamond match the ICDD database 00-027-0997 for cubic zirconia, peaks denoted with a circle match the ICDD database 01-089-5895 for monoclinic Cu(II)O, which were only present in the 50 mol % $CuO_x/ZrO_2$ pre-acid treated catalyst. This is indicative that large CuO particles, which could be responsible for the decomposition of $H_2O_2$ to $H_2O$ and $O_2$, are present in this material.

Evidentially, these species are no longer present after acid treatment and peaks denoted with a triangle are now present in 50 mol % $CuO_x$ post-acid treatment sample. These peaks match the ICDD database 00-043-0953 for orthorhombic $CuZrO_3$ and indicates that the acid treatment also leads to the formation of more intimately mixed Cu—Zr phases in the catalyst.

X-Ray Photoelectron Spectroscopy (XPS) Analysis

Figure 2:
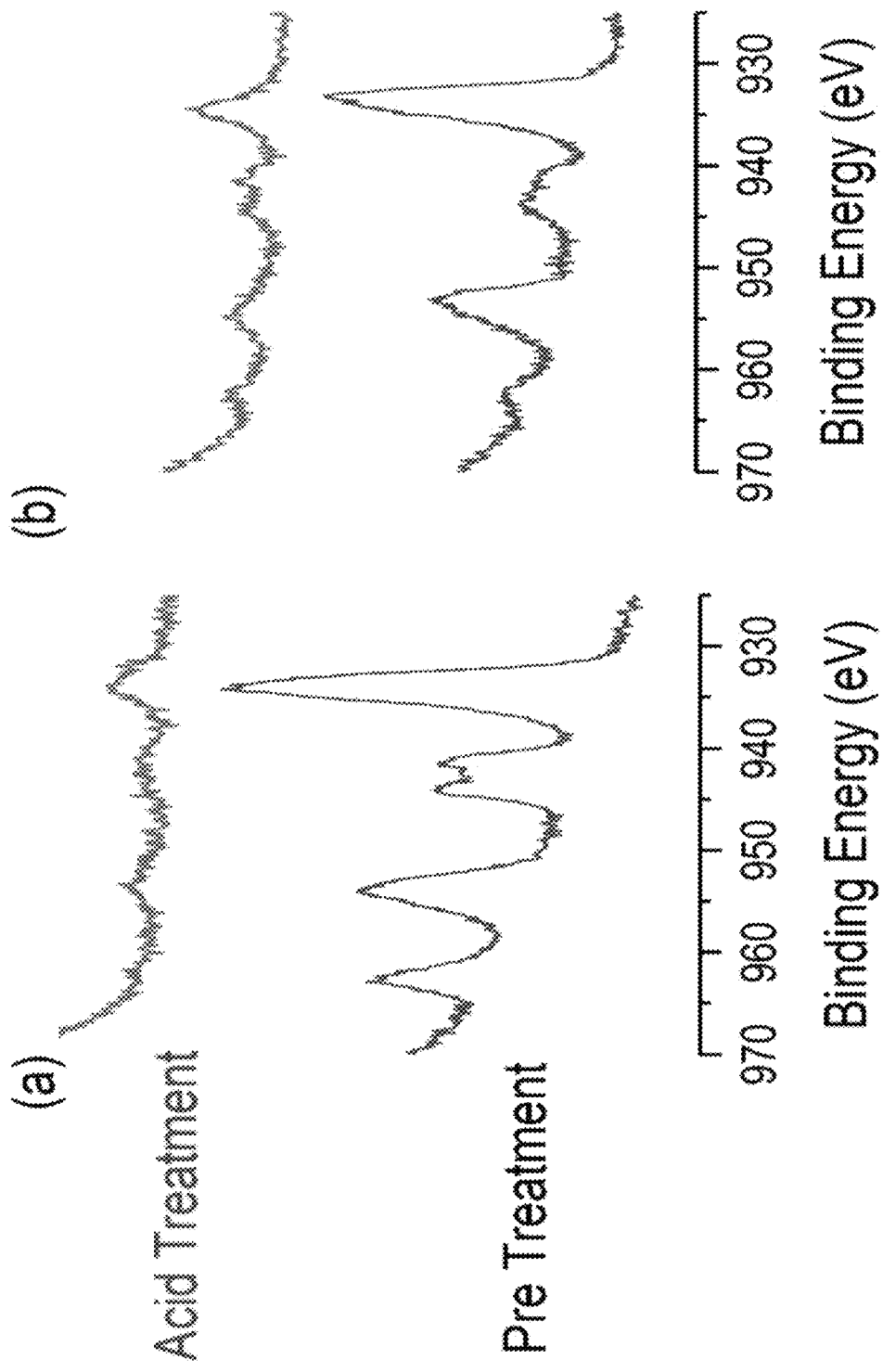
FIGS. 2A-2B show X-ray photoelectron spectroscopy patterns that were used to identify the surface species of the catalyst for: (2A) 50 mol % CuOx/ZrCh and (2B) 10 mol % CuOx/ZrCh.

X-ray photoelectron spectroscopy was used to identify the surface species of the catalyst for: (a) 50 mol % $CuO_x/ZrO_2$ and (b) 10 mol % $CuO_x/ZrO_2$. The analysis is shown in FIG. 2.

Post-acid treatment the intensity of the copper peaks decrease as the acid treatment successfully removes copper from the surface of the catalyst. The main peak observed at binding energy (BE)=934 eV is indicative of CuO, while for the 50 mol % $CuO_x/ZrO_2$ pre acid treatment there are 2 peaks at BE 944 and 941 eV, which indicates the presence of Cu(II)O. The same peak now is more diffuse for 10 mol % $CuO_x/ZrO_2$, which suggests the presence of $Cu(II)(OH)_2$.

Overall, the characterisation of the copper catalyst has identified CuO and $Cu(OH)_2$ species on the surface. The acid treatment appears to remove larger CuO particles and increase the presence of OH species giving the more active bleach catalyst. This suggests that $Cu(OH)_2$ may be the active species for bleaching and/or the removal of CuO could decrease the competing reaction which leads to the decomposition of $H_2O_2$.

SUMMARY OF RESULTS

The results show that mixed metal oxides are an active bleach catalyst for removal of tea stains from a solid surface and that treatment of these catalysts with a concentrated acid increases the bleach activity of both high and low copper concentration catalysts further.

A new heterogeneous bleaching catalyst has therefore been developed using abundant transition metals and that demonstrates technical performance close to that of MnTACN and homogeneous catalysts used currently in ADW formulations.

The invention is defined by the claims.

The invention claimed is:

1. An automatic dishwashing composition comprising:
   a heterogenous bleach catalyst comprising copper oxide on a zirconium oxide carrier, and wherein the heterogeneous bleach catalyst has been acid treated; and
   one or more of a bleaching agent, a builder, and a bleach activator.

2. The automatic dishwashing composition according to claim 1, wherein the copper oxide of the heterogenous bleach catalyst is present in an amount from 1 to 50 mol % relative to the zirconium oxide carrier.

3. The automatic dishwashing composition according to claim 1, wherein the copper surface area of the copper oxide of the heterogenous bleach catalyst is less than 1 $m^2/g$.

4. The automatic dishwashing composition according to claim 1, wherein the heterogenous bleach catalyst has been calcined.

5. The automatic dishwashing composition according to claim 1, wherein the copper oxide of the heterogenous bleach catalyst is present in an amount from 2 to 20 mol % relative to the zirconium oxide carrier.

6. A method of making the automatic dishwashing composition of claim 1, the method comprising:
   mixing the heterogeneous bleach catalyst with one or more of a bleaching agent, a builder, and a bleach activator.

7. The method according to claim 6, wherein the copper oxide of the heterogenous bleach catalyst is present in an amount from 1 to 50 mol % relative to the zirconium oxide carrier.

8. The method according to claim 6, wherein the copper surface area of the copper oxide of the heterogenous bleach catalyst is greater than zero.

9. The method according to claim 6, wherein the copper surface area of the copper oxide of the heterogenous bleach catalyst is greater than 0.01 $m^2/g$ and less than 4 $m^2/g$.

* * * * *